United States Patent
Okuno (10) Patent No.: US 11,941,862 B2
(45) Date of Patent: Mar. 26, 2024

(54) APPARATUS, METHOD, AND STORAGE MEDIUM

(71) Applicant: CANON KABUSHIKI KAISHA, Tokyo (JP)

(72) Inventor: Yasuhiro Okuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 229 days.

(21) Appl. No.: 17/209,922

(22) Filed: Mar. 23, 2021

(65) Prior Publication Data

US 2021/0312593 A1  Oct. 7, 2021

(30) Foreign Application Priority Data

Apr. 1, 2020 (JP) ................. 2020-066048

(51) Int. Cl.
  *G06V 10/44* (2022.01)
  *G06F 18/21* (2023.01)
  *G06F 18/214* (2023.01)
  *G06N 3/04* (2023.01)
  *G06N 3/08* (2023.01)
  (Continued)

(52) U.S. Cl.
  CPC .......... *G06V 10/454* (2022.01); *G06F 18/214* (2023.01); *G06F 18/2193* (2023.01); *G06N 3/04* (2013.01); *G06N 3/08* (2013.01); *G06T 5/002* (2013.01); *G06T 5/50* (2013.01);
  (Continued)

(58) Field of Classification Search
  CPC .... G06V 10/454; G06V 10/774; G06V 10/82; G06F 18/214; G06F 18/2193; G06N 3/04; G06N 3/08; G06N 3/045; G06N 3/084; G06T 5/002; G06T 5/50; G06T 2207/20084; G06T 2207/20081; G06T 2207/20224

See application file for complete search history.

(56) References Cited

U.S. PATENT DOCUMENTS

2019/0138838 A1* 5/2019 Liu .................. G06N 3/045
2019/0251668 A1* 8/2019 Meyer ............... G06T 5/002
(Continued)

OTHER PUBLICATIONS

Kiao-Jiao Mao, et al.; "Image Restoration Using Very Deep Convolutional Encoder-Decoder Networks with Symmetric Skip Connections;" 30th Conference of Neural Information Processing Systems (NIPS 2016), Barcelona, Spain; pp. 1-9.

Primary Examiner — Oneal R Mistry
Assistant Examiner — Vaisali Rao Koppolu
(74) Attorney, Agent, or Firm — CANON U.S.A., INC. IP Division (57) ABSTRACT

An apparatus acquires a low-noise image, which is training data for training an image processing model, and a plurality of high-noise images corresponding to the same scene in the low-noise image data and each having different noise patterns. The apparatus calculates each of errors between a plurality of estimated output values, which is acquired by inputting a different one of the plurality of high-noise images to the image processing model and the low-noise image. Then, the apparatus calculates an anti-noise stability based on an error between the plurality of estimated output values, and trains the image processing model using a loss function including the errors between the plurality of estimated output values and the low-noise image and the anti-noise stability.

19 Claims, 8 Drawing Sheets (51) Int. Cl.
*G06T 5/00* (2006.01)
*G06T 5/50* (2006.01)
*G06V 10/774* (2022.01)
*G06V 10/82* (2022.01)

(52) U.S. Cl.
CPC ............ *G06V 10/774* (2022.01); *G06V 10/82* (2022.01); *G06T 2207/20084* (2013.01)

(56) References Cited

U.S. PATENT DOCUMENTS

2020/0082508 A1* 3/2020 Alletto .................... G06N 3/047
2021/0272240 A1* 9/2021 Litwiller ................... A61B 6/52
2021/0390668 A1* 12/2021 Ren ........................... G06T 5/50

* cited by examiner

APPARATUS, METHOD, AND STORAGE MEDIUM

BACKGROUND OF THE DISCLOSURE

Field of the Disclosure

The aspect of the embodiments relates particularly to an image processing apparatus, an image processing method, and a storage medium that are effectively usable for training an image processing model.

Description of the Related Art

In recent years, imaging apparatuses such as digital cameras have faced an increasing demand for acquiring a high-quality image even under an environment such as a dark place or during the night. Under such an environment, a bright image can be captured by increasing International Organization for Standardization (ISO) sensitivity. However, while increasing the ISO sensitivity makes a response to light highly sensitive and allows acquisition of a bright image, an issue of an increase in a noise amount is raised since a response to noise also becomes highly sensitive. To solve the issue, there has been being developed a noise reduction technique for reducing the noise in the image captured with high sensitivity by image processing.

A noise reduction technique based on a machine learning technique using a convolutional neural network (CNN) is discussed in "Image restoration using very deep convolutional encoder-decoder networks with symmetric skip connections" written by Xiaojiao Mao, Chunhua Shen, and Yu-Bin Yang in Advances in Neural Information Processing Systems 2016 (Mao et al.). According to the publication, a neural network is trained using a low-noise image of the same scene as a teaching image to output a low-noise image from an input high-noise image.

SUMMARY OF THE DISCLOSURE

According to an aspect of the embodiments, an apparatus configured to train an image processing model for removing noise from an image containing the noise, the apparatus includes an acquisition unit configured to acquire a low-noise image and a plurality of high-noise images, the low-noise image being training data for training the image processing model, the plurality of high-noise images corresponding to a scene in the low-noise image and each having different noise patterns, an error calculation unit configured to calculate each of errors between a plurality of output images and the low-noise image, each of the plurality of output images being acquired by inputting a different one of the plurality of high-noise images to the image processing model, a stability calculation unit configured to calculate a stability against the noise based on an error between the plurality of output images, and a training unit configured to train the image processing model using a loss function including the calculated errors and the calculated stability.

Further features of the disclosure will become apparent from the following description of exemplary embodiments with reference to the attached drawings.

DESCRIPTION OF THE EMBODIMENTS

The technique discussed in Mao et al. easily produces such a negative effect that a false pattern due to a noise pattern of a high-noise image is output when the input high-noise image has a high noise intensity. It is because a texture having a low luminance value in a teaching image and a luminance value of a noise in the input data become closer to each other as the noise intensity increases, and this makes it difficult to distinguish them from each other. Since, for a texture having a low luminance value in the teaching image, the neural network is trained to reconstruct the texture, the neural network may accidentally falsely respond when a noise having a low luminance value in the input data happens to exhibit a pattern resembling to the texture in the teaching image. As a result, the neural network may output a false pattern not existing in the actual scene.

In consideration of the above-described issue, the present disclosure is directed to training an image processing model to reduce such a negative effect that a false pattern due to a noise pattern is output when performing processing for reducing a noise.

In the following description, a first exemplary embodiment will be described with reference to the drawings. A description will be given of an image processing apparatus that reduces noise in an image.

Figure 1:
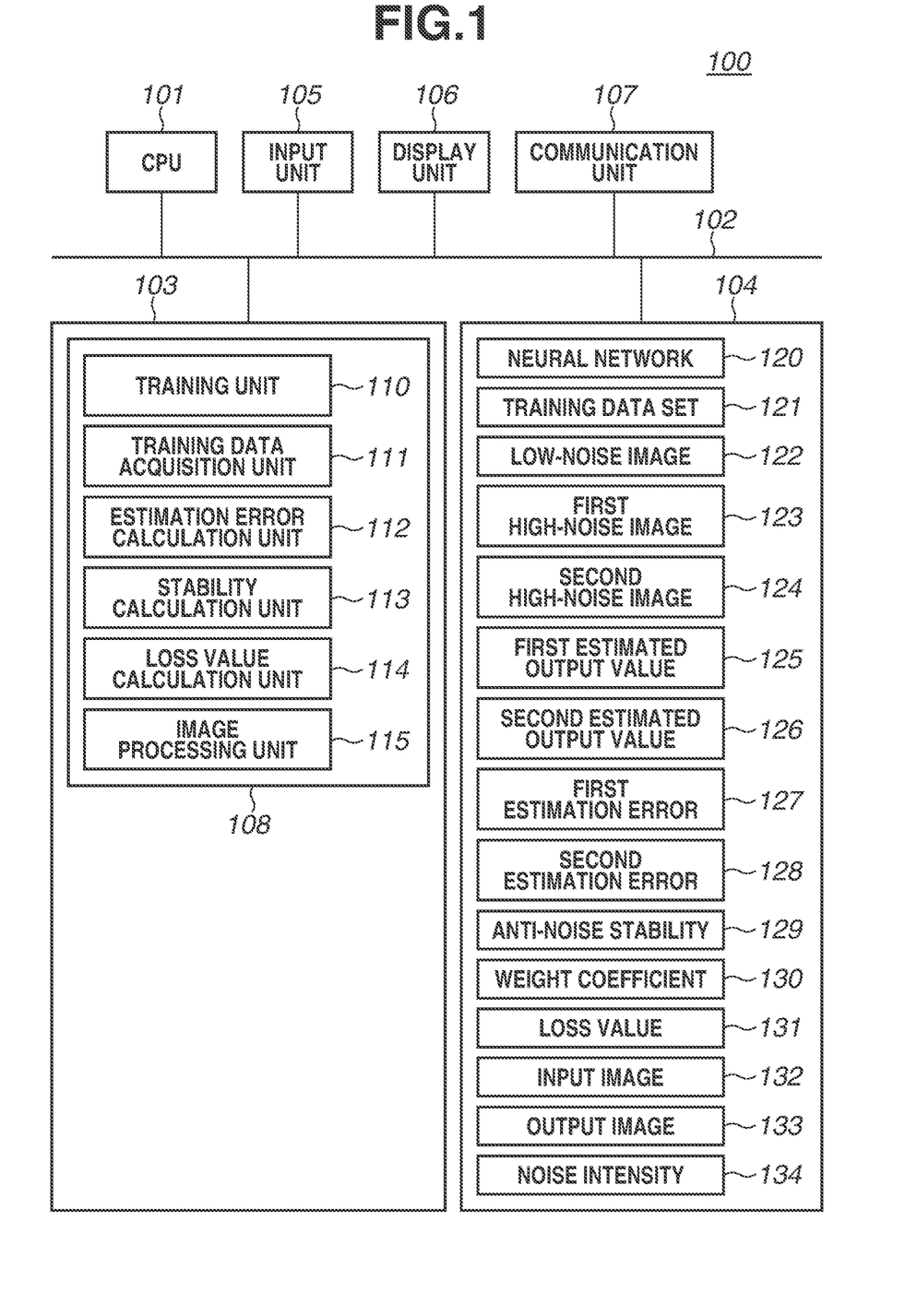
FIG. 1 is a block diagram of an image processing apparatus according to a first exemplary embodiment.

FIG. 1 is a block diagram illustrating an example of the internal configuration of an image processing apparatus 100 according to the present exemplary embodiment.

In FIG. 1, a central processing unit (CPU) 101 controls the entire image processing apparatus 100. An input unit 105 includes a keyboard, a touch panel, and/or the like, and receives an input from a user such as specifying an image to be targeted for image processing. A display unit 106 includes a liquid-crystal display or the like, and displays the image targeted for the processing and an image resulting from the processing. A communication unit 107 transmits and receives data via communication with another apparatus.

A first memory 103 mainly stores a control program 108 therein, and a second memory 104 mainly stores therein various kinds of data that will be described below. These components are connected via a bus 102. The data and the like stored in the first memory 103 and the second memory 104 are not limited to the example illustrated in FIG. 1.

A training data set 121 is stored in the second memory 104 in advance, and the training data set 121 is a data set containing one or more low-noise images. A neural network 120 having multiple layers, such as a convolutional neural network (CNN), which is an example of an image processing model according to the present exemplary embodiment, is also stored in the second memory 104. As will be described in detail below, this image processing model is trained by a training unit 110, and a parameter of the trained neural network 120 is stored in the second memory 104 and this parameter is updated as the image processing model is trained. The neural network 120 is configured to input an image and then output an image. While the neural network is used as an example of the image processing model in the present exemplary embodiment, the image processing model is not limited to the neural network as long as the image processing model is a trainable model.

The control program 108 stored in the first memory 103 includes at least a program for executing processing according to the present exemplary embodiment. The CPU 101 functions as the training unit 110, a training data acquisition unit 111, an estimation error calculation unit 112, a stability calculation unit 113, a loss value calculation unit 114, and an image processing unit 115 by executing the control program 108. Each of these units may be realized by software using the CPU 101 or may be configured to be partially realized by hardware such as an electronic circuit. Processing in each of these units will be described below in the descriptions of flowcharts.

In the present exemplary embodiment, the image processing unit 115 performs image processing using the image processing model (the neural network 120) trained by the training unit 110. The neural network 120 receives an input of a high-noise image that is generated by adding artificial noise to an actually captured image or a computer graphics (CG) image, and outputs an image that is obtained by removing the noise from the high-noise image using a low-noise image to which the noise is yet to be added, as a teaching image. By this process, the neural network 120 is trained. The basic processing for the training is similar to a known technique, and the neural network 120 is trained using a method such as the backpropagation method based on a loss value calculated according to a predetermined loss function. This is a known technique, and therefore the detailed description thereof will be omitted herein. The present exemplary embodiment is characterized by the method for calculating the loss value, and will be described below especially focusing on the calculation method.

Figure 2:
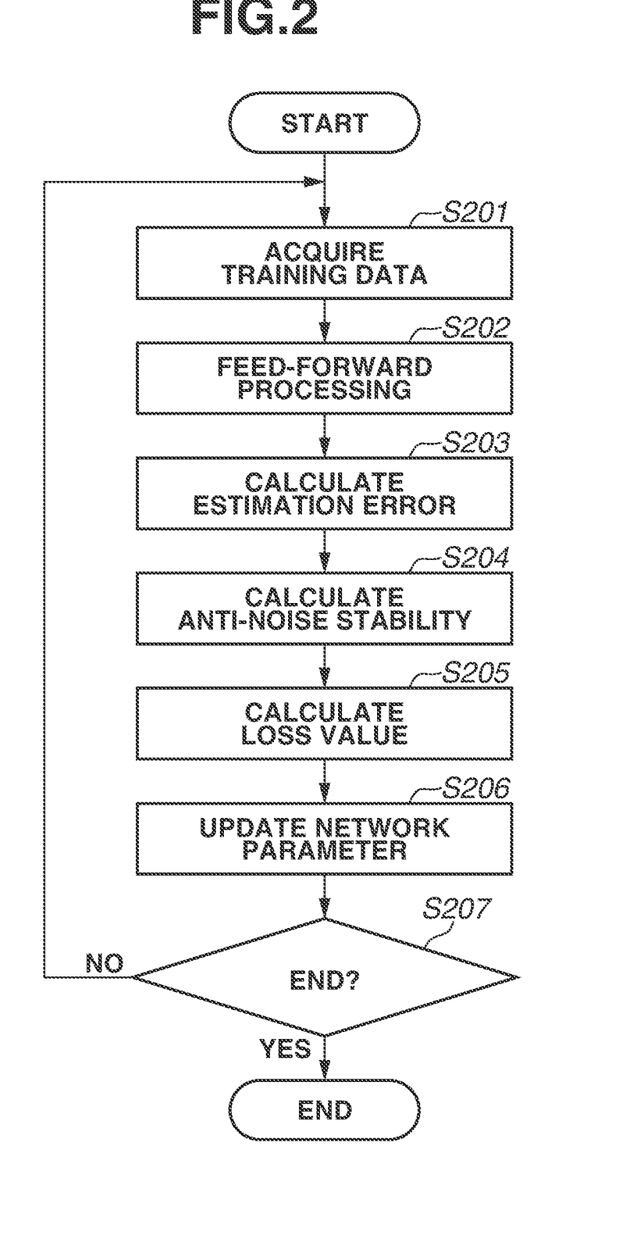
FIG. 2 is a flowchart illustrating an example of training processing.

FIG. 2 is a flowchart illustrating an example of the basic processing procedure of the training processing according to the present exemplary embodiment.

First, in step S201, the training data acquisition unit 111 acquires the training data. The details of the processing by the training data acquisition unit 111 will be described.

Figure 3:
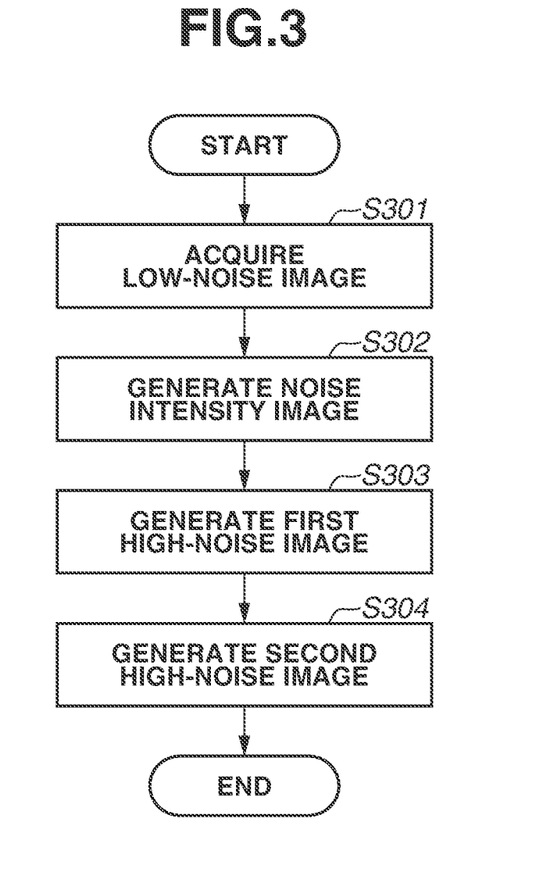
FIG. 3 is a flowchart illustrating an example of processing for acquiring training data.

FIG. 3 is a flowchart illustrating an example of the detailed processing procedure in step S201 illustrated in FIG. 2.

In step S301, the training data acquisition unit 111 extracts one low-noise image from the training data set 121 and stores it into the second memory 104 as a low-noise image 122.

In step S302, the training data acquisition unit 111 generates a noise intensity from the low-noise image 122 and stores it into the second memory 104 as a noise intensity 134. As will be used herein, the noise intensity refers to a value indicating an intensity of noise that is defined by a noise model, and the noise model refers to a function modeling dark current noise or shot noise in an image sensor in the course of imaging of a digital image. For example, the noise model is such a function that the noise intensity is expressed as a standard deviation of the noise and a standard deviation IG of the noise is defined by the following equation (1):

$$I_\sigma = I_0 + K \cdot I \quad (1),$$

where a variable I represents a luminance value in the low-noise image.

$I_0$ and K in the equation (1) are constants, and are values determined in advance according to the nature of the noise in the image senor. What kind of function is used for the noise model is not especially limited. In the present exemplary embodiment, the noise intensity is calculated by substituting the luminance value in the low-noise image 122 into the function of the noise model expressed as the equation (1). In this manner, the noise intensity is calculated to be as a value corresponding to the luminance value, and the noise intensity 134 of the low-noise image 122 is expressed as a map having the same number of elements as the low-noise image 122.

Next, in step S303, the training data acquisition unit 111 generates a first high-noise image by adding the noise to the low-noise image 122, and stores it into the second memory 104 as a first high-noise image 123. This processing can be realized by generating a random number map having the same number of elements as the noise intensity 134 according to the standard deviation in the noise intensity 134 generated in the previous step, step S302, and adding the noise to the low-noise image 122 element by element according to the generated map.

In step S304, the training data acquisition unit 111 generates a second high-noise image in which noise having a different pattern from the noise added in step S303 is added to the low-noise image 122, and stores it into the second memory 104 as a second high-noise image 124. This processing can be realized by generating a random number map different from the map generated in step S303 from the noise intensity 134 using a random number sequence different from the map generated in step S303 and adding the noise to the low-noise image 122 element by element similarly to the previous step, step S303.

Both the original images of the first high-noise image 123 and the second high-noise image 124 are the same low-noise image 122, and difference therebetween is the pattern of the added noise. While, two high-noise images are generated from one low-noise image in the present exemplary embodiment, two high-noise images may be generated in advance. For example, a low-noise image and two high-noise of the same scene may be stored in the training data set 121 in advance. Such a preparation can be realized by capturing one image with a setting of low ISO sensitivity and two images with a setting of high ISO sensitivity with respect to the same scene and storing the three images in association with one another based on filenames or the like. In this case, the training data acquisition unit 111 can appropriately perform the processing in step S201 by extracting the associated one low-noise image and two high-noise images from the training data set 121 and storing each of them into the second memory 104.

Referring back to the description of FIG. 2, next, in step S202, the training unit 110 performs feed-forward processing. The feed-forward processing refers to processing in which input data is input to the neural network 120 and acquires an output value thereof.

Figure 4:
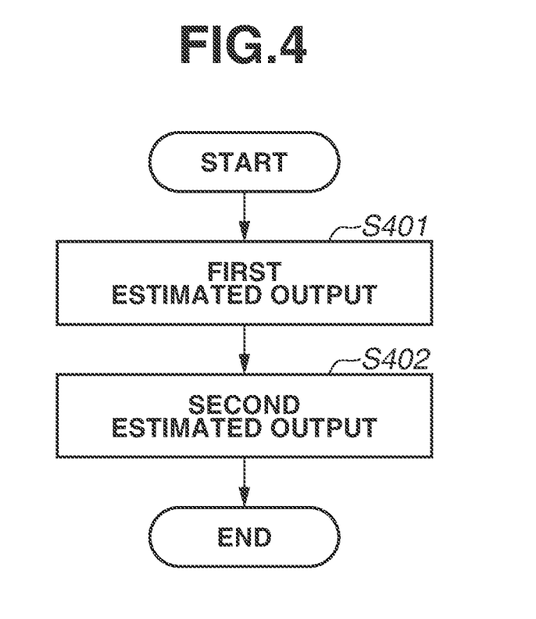
FIG. 4 is a flowchart illustrating an example of feed-forward processing.

FIG. 4 is a flowchart illustrating an example of the detailed processing procedure in step S202 illustrated in FIG. 2.

In step S401, the training unit 110 inputs the first high-noise image 123 stored in the second memory 104 to the neural network 120 and stores an acquired final output into the second memory 104 as a first estimated output value 125.

In step S402, the training unit 110 inputs the second high-noise image 124 stored in the second memory 104 to the neural network 120 and stores an acquired final output into the second memory 104 as a second estimated output value 126. While feed-forward processing in commonly-used processing for training a neural network is processing that acquires one output from one piece of input data, the feed-forward processing in the present exemplary embodiment is configured to acquire two outputs from two pieces of input data.

Referring back to the description of FIG. 2, next, in step S203, the estimation error calculation unit 112 calculates an estimation error. In this processing, the estimation error calculation unit 112 calculates an error between an estimated output value and a teaching value using the low-noise image 122 as the teaching value. More specifically, first, the estimation error calculation unit 112 calculates an error between the low-noise image 122 and the first estimated output value 125 and stores the result into the second memory 104 as a first estimation error 127. Then, the estimation error calculation unit 112 calculates an error between the low-noise image 122 and the second estimated output value 126 and stores the result into the second memory 104 as a second estimation error 128. The estimation error may be defined in any manner, such as being defined by an L1 distance or an L2 distance that is a difference in value between the low-noise image and the estimated output value in each element (each pixel). In the present exemplary embodiment, for example, the estimation error is calculated according to the following equation (2):

estimation error=(Σ|low-noise image−estimated output value|)/total number of elements    (2).

The difference is calculated element by element at the subtraction calculation (−) in the equation (2). In other words, the estimation error is defined by calculating the sum of the absolute value of the difference for each element and dividing the sum by the total number of elements to calculate an average thereof.

Next, in step S204, the stability calculation unit 113 calculates an anti-noise stability and stores it into the second memory 104 as an anti-noise stability 129. In this processing, the stability calculation unit 113 calculates the anti-noise stability by calculating an error between the first estimated output value 125 and the second estimated output value 126 stored in the second memory 104. The error in this processing may be defined in any manner, such as being defined by an L1 distance or an L2 distance that is a difference in value between the first estimated output value 125 and the second estimated output value 126 in each element. In the present exemplary embodiment, the anti-noise stability has a value that reduces as the first estimated output value 125 and the second estimated output value 126 become closer to each other. The stability calculation unit 113 calculates the error between the first estimated output value 125 and the second estimated output value 126 to thus calculate the anti-noise stability, by, for example, calculating the difference element by element and calculating the average thereof according to the following equation (3):

anti-noise stability=(Σ|first estimated output value−second estimated output value|)/total number of elements    (3).

Next, in step S205, the loss value calculation unit 114 calculates a loss value and stores it into the second memory 104 as a loss value 131. In this processing, the loss value calculation unit 114 calculates the weighted sum of the first estimation error 127, the second estimation error 128, and the anti-noise stability 129 as the loss value. A weight coefficient 130 stored in the second memory 104 in advance is used to calculate the weighted sum. In the present exemplary embodiment, since the loss value is calculated as the weighted sum of the three values, the weight coefficient 130 includes three weight coefficients. The loss value calculation unit 114 calculates the loss value using the following equation (4):

loss value=α·first estimation error+β·second estimation error+γ·anti-noise stability    (4), where α, β, and γ represent the respective weight coefficients.

The first term and the second term in the equation (4) each indicate a loss meaning how much the output result of the neural network 120 is close to the low-noise image 122 serving as the teaching image. This is generally called a reconstruction loss. These terms mean that, as the values reduce, the noise contained in the high-noise image is appropriately removed.

Meanwhile, the third term in the equation (4) indicates a property about how much the neural network 120 is stabilized against a difference in noise. As this third term increases, the neural network 120 increases a possibility that a different output result is acquired therefrom due to a slight difference in noise. In the present exemplary embodiment, the neural network 120 is trained to further reduce the third term, and therefore the neural network 120 is trained to output similar results regardless of what kind of noise pattern has been added to the low-noise image 122. Accordingly, the neural network 120 is trained not to output the false pattern due to the noise pattern.

A pattern having a low luminance value may be contained in both the teaching image and the noise pattern. Therefore, a loss function including the first term and the second term would undesirably cause the neural network 120 to be trained to output the false pattern when a noise pattern similar to, for example, a pattern originally contained in the teaching image is input. Therefore, the present exemplary embodiment is configured to impose a restriction by using the third term in the loss function to prevent a change in the output result even when the noise pattern is changed. As a result, the neural network 120 is trained in such a manner that, even in a case where a pattern similar to the pattern of the noise is contained in the teaching image, the neural network 120 does not respond to this pattern. How closely the low-noise image 122 is reconstructed and how much the occurrence of the false pattern is reduced can be adjusted using the setting of the weight coefficient 130.

Next, in step S206, the training unit 110 updates the parameter of the neural network 120 based on the loss value calculated in the previous step, step S205. This is the training processing using the backpropagation method or the like, which is generally practiced in training of a neural network, and is to be performed using a known method.

After the training with respect to one piece of training data is completed by the processing from steps S201 to S206 in the above-described manner, in step S207, the training unit 110 determines whether the training is ended. In a case where the training is ended as a result of the determination (YES in step S207), the processing is ended. Examples of a condition for the end of the training include a stop of a reduction in the loss value by a predetermined or larger value. In a case where the training is not ended as a result of the determination (NO in step S207), the processing returns to step S201, and the training unit 110 continues the processing by extracting new training data from the training data set 121. In a case where processing for all the pieces of training data in the training data set 121 ends, the training unit 110 can continue the processing by returning to the first training data and repeating the procedure.

In the present exemplary embodiment, in the training processing, the two types of high-noise images are generated. Then, when the estimation error and the anti-noise stability are calculated, each of them is calculated with respect to the two types of estimated output values. However, this number may be three types or more.

The image processing for reducing noise of an unknown image using the already trained neural network 120 trained by the training unit 110 or the like, and a procedure thereof will be described next.

Figure 5:
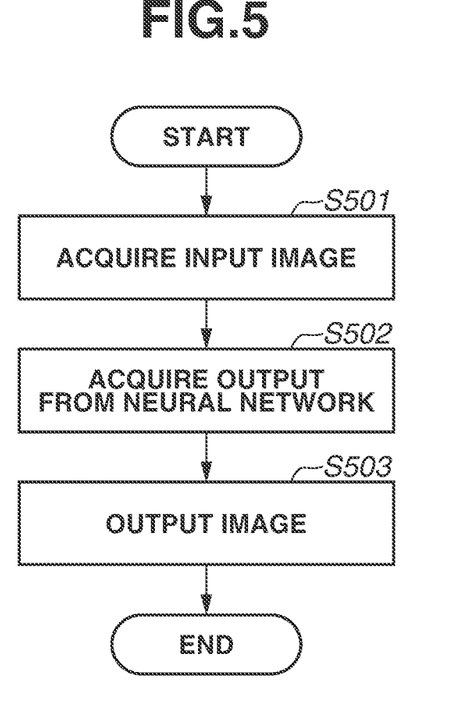
FIG. 5 is a flowchart illustrating an example of noise reduction processing performed on an unknown image.

FIG. 5 is a flowchart illustrating an example of the processing procedure by the image processing unit 115 according to the present exemplary embodiment.

In step S501, the image processing unit 115 acquires the image targeted for the image processing via the input unit 105 and stores it into the second memory 104 as an input image 132. The method for acquiring the image is not especially limited. In a case where the image processing apparatus 100 according to the present exemplary embodiment includes an imaging unit, the image may be acquired not via the input unit 105 but directly acquired from the imaging unit (not illustrated) and stored into the second memory 104. The image may be acquired from another apparatus via the communication unit 107 and stored into the second memory 104.

In step S502, the image processing unit 115 inputs the input image 132 to the neural network 120 and stores an output therefrom into the second memory 104 as an output image 133. Then, in step S503, the image processing unit 115 reads out the output image 133 from the second memory 104 and outputs and displays it onto the display unit 106. The output image 133 may be, for example, transmitted to another apparatus via the communication unit 107 instead of being output onto the display unit 106.

In this manner, according to the present exemplary embodiment, the training of the image processing model and the image processing can be performed to acquire a stable output result regardless of the noise pattern.

In the following description, a second exemplary embodiment will be described. The present exemplary embodiment will be described, omitting the descriptions of similar constituent components to the first exemplary embodiment, and focusing on differences from the first exemplary embodiment. The present exemplary embodiment is different from the first exemplary embodiment in terms of the calculation method employed by the stability calculation unit 113.

The anti-noise stability is an index indicating how much the estimation result output by the neural network 120 is changed according to the noise pattern. In the first exemplary embodiment, the anti-noise stability is defined by the average value of the absolute value of the difference between the two estimated output values for each element as indicated by the equation (3).

Meanwhile, the change amount of the estimated output value in response to an input image containing different noise is positively correlated to the amount of the noise added when the high-noise image is generated, and therefore a relatively small value tends to be output as the change amount in a region containing a small amount of noise. Therefore, since the term indicating the anti-noise stability (the third term) in the loss function expressed as the equation (4) has a small value in a region originally containing a small amount of noise, the term fails to sufficiently serve as the index of the noise stability. Therefore, as a countermeasure against such an issue, the present exemplary embodiment normalizes the anti-noise stability using the noise intensity 134 stored in the second memory 104 and calculates the anti-noise stability based on the following equation (5):

$$\text{anti-noise stability} = (\Sigma |(\text{first estimated output value} - \text{second estimated output value})/\text{noise intensity}|)/\text{total number of elements} \quad (5).$$

In the equation (5), the division by the noise intensity is carried out element by element. The division by the noise intensity 134 may be replaced with division by the random number map that is used to add the noise to the low-noise image 122 when the high-noise image is generated in step S303 or S304 illustrated in FIG. 3.

The anti-noise stability may be calculated by factoring in a difference in characteristic amount between the estimated output values, using the following equation (6):

$$\text{anti-noise stability} = (\Sigma |F(\text{first estimated output value}) - F(\text{second estimated output value})|)/\text{total number of elements} \quad (6),$$

where some sort of statistic is used as the characteristic amount.

The function F in the equation (6) is a function that calculates the characteristic amount near an element with respect to each element of the estimated output value set as an argument, and is, for example, a function that calculates the value of a standard deviation near the element. When the statistic in an image is generally the same, humans often have the same impression. For example, in a case where two image regions are disorganized to similar degrees, these image regions give similar impressions even if the values are not equal between corresponding elements. The training can be performed without excessively restricting the anti-noise stability by utilizing this tendency and calculating the anti-noise stability for each element as the value of the standard deviation near the element. The present exemplary embodiment has been described referring to the example using the standard deviation as the characteristic amount, but the characteristic amount is not limited thereto. The anti-noise stability may be calculated using various kinds of statistics, such as a mean, a maximum value, a minimum value, and a median value in the neighboring region or another some kind of characteristic amount.

The anti-noise stability may be calculated with a weight added according to the magnitude of the estimation error using the following equation (7):

$$\text{anti-noise stability} = (\Sigma |(\text{first estimated output value} - \text{second estimated output value})/\text{average estimation error}|)/\text{total number of elements} \quad (7).$$

The average estimation error in the equation (7) is a value acquired by calculating the average of the first estimation error 127 and the second estimation error 128 element by element. The division by the above-described average estimation error is carried out element by element. According to the equation (7), a value of the anti-noise stability to be calculated increases with decrease in an average estimation error of an element. More specifically, the equation (7) allows the loss of the anti-noise stability indicated by the third term to be more exerted for an element at which the estimated output value is closer to the teaching image and the training based on the reconstruction loss is more difficult (an element at which the first term and the second term in the loss function expressed as the equation (4) are smaller). According to the conventional training method, the neural network is trained based on the reconstruction loss, and the negative effect of the false pattern is output when the neural network is trained based thereon. In the present exemplary embodiment, the image processing apparatus 100 can reduce the negative effect of the false pattern by allowing the loss of the anti-noise stability to be largely exerted for a portion at which the reconstruction loss is not sufficient for achieving correct training.

In this manner, according to the present exemplary embodiment, the image processing apparatus 100 is configured to calculate the anti-noise stability more appropriately, whereby the image processing apparatus 100 can train the image processing model with which the negative effect such as the false pattern is further reduced.

In the following description, a third exemplary embodiment will be described. The present exemplary embodiment will be described, omitting the description of similar processing to the first exemplary embodiment, and focusing on differences from the first exemplary embodiment.

Figure 6:
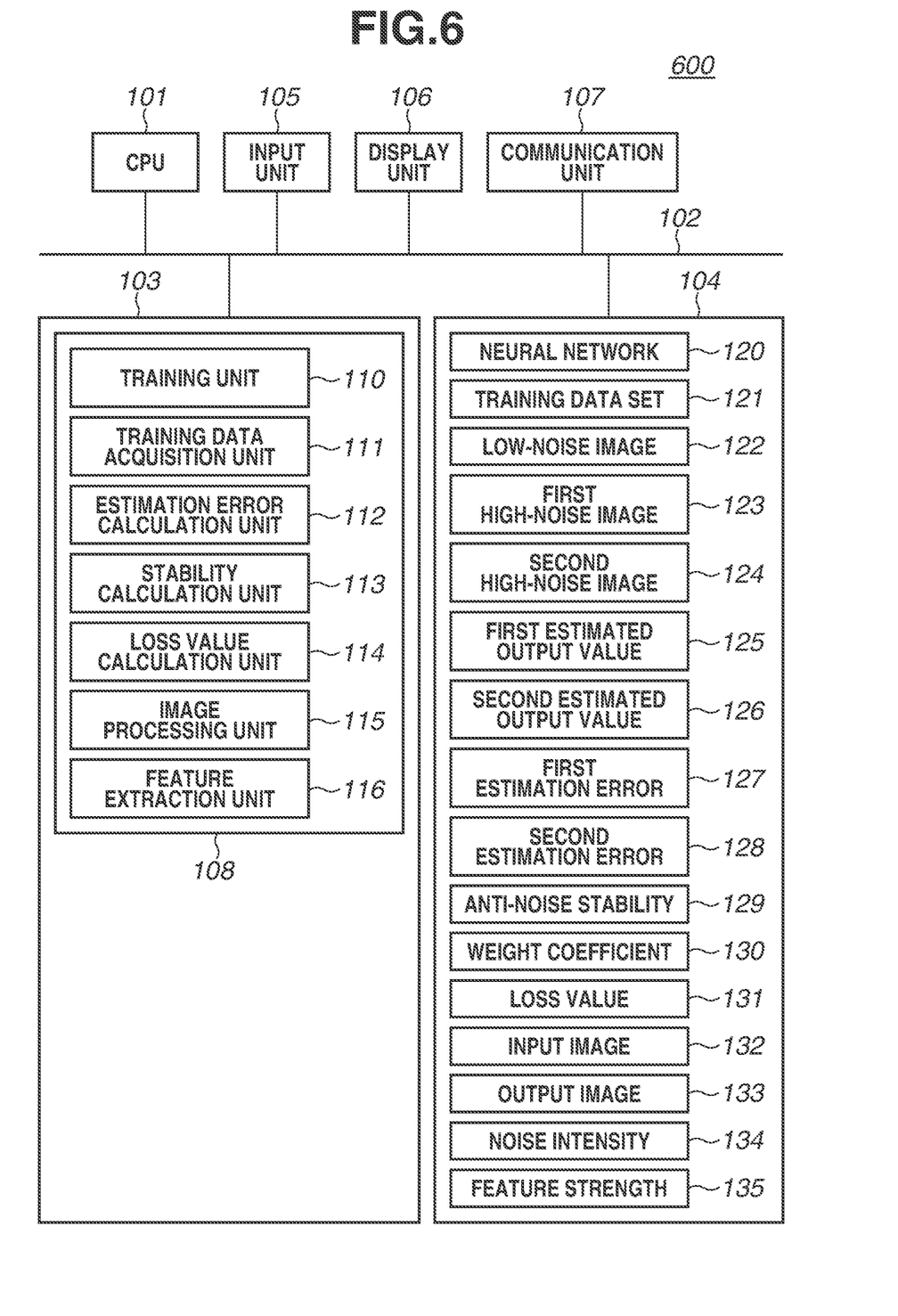
FIG. 6 is a block diagram of an image processing apparatus according to a third exemplary embodiment.

FIG. 6 is a block diagram illustrating an example of the internal configuration of an image processing apparatus 600 according to the present exemplary embodiment.

In the present exemplary embodiment, the image processing apparatus 600 includes a feature extraction unit 116 in the control program 108 stored in the first memory 103. The feature extraction unit 116 performs feature extraction processing on the low-noise image 122 serving as the teaching image and stores a result of the processing into the second memory 104 as a feature strength 135. For example, edge extraction processing corresponds to the feature extraction processing, but the feature extraction processing is not limited thereto and the feature extraction unit 116 may perform the processing to extract a feature such as contrast near each element. The feature strength 135 is stored as a map having a larger value for a region exhibiting a stronger feature in the low-noise image 122. The number of elements in the feature strength 135 is equal to the low-noise image 122, and is also equal to the numbers of elements in the first estimated output value 125 and the second estimated output value 126.

In the present exemplary embodiment, the stability calculation unit 113 calculates the anti-noise stability according to the following equation (8):

$$\text{anti-noise stability} = (\Sigma|\text{first estimated output value} - \text{second estimated output value}|/\text{feature strength}|)/\text{total number of elements} \quad (8)$$

The division by the feature strength 135 is carried out element by element in the equation (8). According to the equation (8), the anti-noise stability to be calculated is relatively decreased with increase in features, on for example, an edge. The negative effect like the output of the false pattern rarely becomes a serious issue in a region having a strong feature because the false pattern does not stand out even in a case where a weak false pattern appears in such a region. Meanwhile, the anti-noise stability is calculated to obtain a larger value for a region having a weak feature because the false pattern stands out in such a region.

In the above-described manner, according to the present exemplary embodiment, the region in which the negative effect such as the false pattern becomes a serious issue can be intensively evaluated based on the strength of the feature. As a result, the image processing model can be trained to further reduce the negative effect.

Fourth Exemplary Embodiment

In the following description, a fourth exemplary embodiment will be described. The present exemplary embodiment will be described, omitting the description of similar processing to the first exemplary embodiment, and focusing on differences from the first exemplary embodiment.

Figure 7:
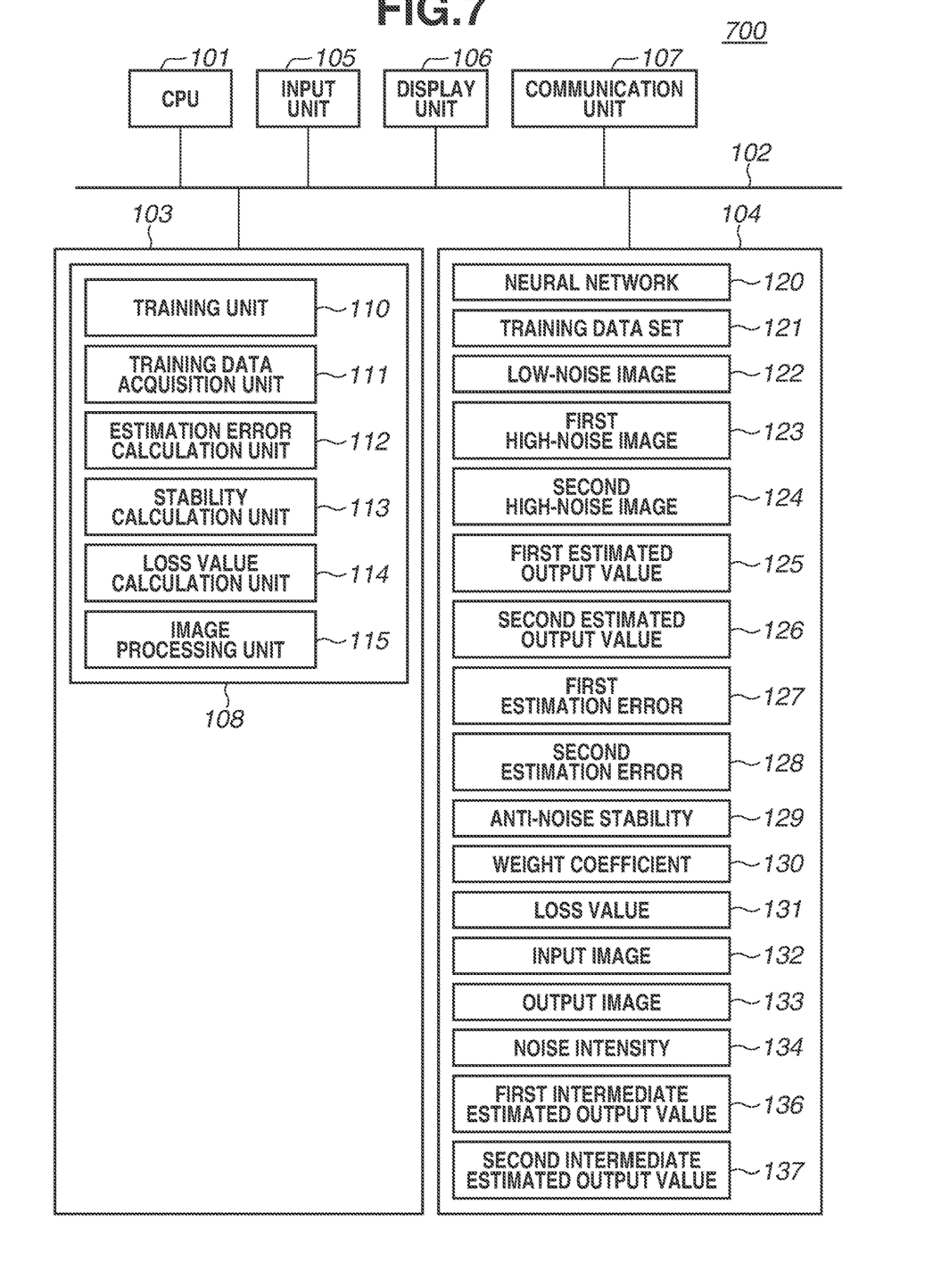
FIG. 7 is a block diagram of an image processing apparatus according to a fourth exemplary embodiment.

FIG. 7 is a block diagram illustrating an example of the internal configuration of an image processing apparatus 700 according to the present exemplary embodiment. The present exemplary embodiment is different from the first exemplary embodiment in a way that a first intermediate estimated output value 136 and a second intermediate estimated output value 137 are stored into the second memory 104. The basic procedure of the training processing according to the present exemplary embodiment is similar to FIG. 2 but the feed-forward processing in step S202 is different from the procedure described with reference to FIG. 4.

Figure 8:
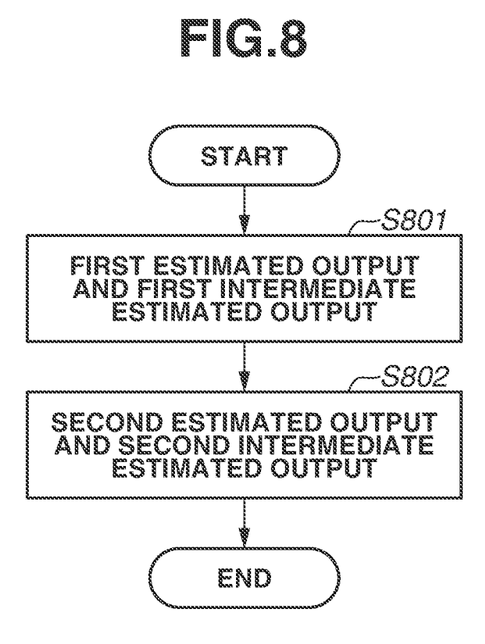
FIG. 8 is a flowchart illustrating an example of feed-forward processing according to the fourth exemplary embodiment.

FIG. 8 is a flowchart illustrating an example of the detailed procedure of the feed-forward processing according to the present exemplary embodiment.

In step S801, the training unit 110 inputs the first high-noise image 123 stored in the second memory 104 to the neural network 120 and stores an acquired final output into the second memory 104 as the first estimated output value 125. Further, the training unit 110 stores an output from a predetermined intermediate layer of the neural network 120 into the second memory 104 as the first intermediate estimated output value 136. The intermediate layer that outputs the first intermediate estimated output value 136 is preset, and the intermediate layer may be any layer and may be a plurality of layers.

In step S802, the training unit 110 inputs the second high-noise image 124 stored in the second memory 104 to the neural network 120 and stores an acquired final output into the second memory 104 as the second estimated output value 126. Further, the training unit 110 stores an output from a predetermined intermediate layer of the neural network 120 into the second memory 104 as the second intermediate estimated output value 137. The setting of the intermediate layer targeted for the storage of the output is similar to the setting in step S801. While the final output of the neural network 120 is stored into the second memory 104 in the first to third exemplary embodiments, the output from the intermediate layer is also stored into the second memory 104 in the present exemplary embodiment.

Next, the processing by the stability calculation unit 113 according to the present exemplary embodiment will be described. In the present exemplary embodiment, the anti-noise stability is calculated according to the following equation (9):

$$\text{anti-noise stability} = (\Sigma(a \cdot |\text{first estimated output value} - \text{second estimated output value}| + b \cdot |\text{first intermediate estimated output value} - \text{second intermediate estimated output value}|)/\text{total number of elements} \quad (9)$$

In the equation (9), a and b represent weight coefficients, and are stored in the second memory 104 in advance together with the three weight coefficients α, β, and γ in the equation (4) as a part of the weight coefficient 130. In the case where intermediate estimated values are acquired from a plurality of intermediate layers in each of steps S801 and S802, the equation (9) additionally includes as many terms as the layers for calculating the error between the intermediate estimated outputs, and as many weight coefficients as the addition are also stored in advance.

In the above-described manner, according to the present exemplary embodiment, the image processing apparatus 700 can train the image processing model while also reflecting the output result from the predetermined intermediate layer with respect to the two inputs that are different from each other in terms of the noise pattern. In a multi-layered neural network, a target to which a layer reacts varies for each layer, and a specific layer may be linked to a specific negative effect. The negative effect can be efficiently reduced by training of the image processing model in which the output of such a layer is constrained from varying due to the difference in noise pattern. The present exemplary embodiment may be combined in the second or third exemplary embodiment.

Each of the above-described exemplary embodiments has been described taking a case where the image processing model is trained in the processing for reducing the noise such as the dark current noise or the shot noise in the image sensor, as an example, but the type of the noise is not limited thereto. In a case where the image processing model is trained in reconstruction of a teaching image using an image acquired by adding some change to the teaching image as an input image, the training can also be performed while the change is defined as the noise. The processing according to any of the above-described embodiments can be applied by using the input image with such a change made thereto as the high-noise image.

As an example of the change, the processing according to any of the above-described embodiments can also be applied to, for example, processing for correcting instability in the atmosphere. In this case, the training is performed using, as the high-noise image, a plurality of images each acquired by processing for adding a different type of instability to the teaching image. As another example of the change, the processing according to any of the above-described embodiments can also be applied to inpainting processing for complementing a missing portion in an image. In this case, the training is performed using, as the high-noise image, a plurality of images each acquired by processing for adding a different type of image missing to the teaching image. As further another example of the change, the processing according to any of the above-described embodiments can also be applied to super-resolution processing for reproducing a high-resolution image from a low-resolution image. In this case, each of a plurality of low-resolution images acquired by converting the high-resolution image serving as the teaching image into the low-resolution images using a plurality of different methods is used as the high-noise image. In any case, the image processing apparatus can train the image processing model in a manner such that the image processing model can perform a stable output against the change made at the time of the training and reduce the negative effect such as the output of the false pattern by being configured as described in any of the above-described exemplary embodiments.

The present disclosure can also be realized by processing that supplies a program capable of fulfilling one or more functions of the above-described exemplary embodiments to a system or an apparatus via a network or a storage medium, and causes one or more processors in a computer of the system or apparatus to read out and execute the program. The present disclosure can also be realized by a circuit (for example, an application specific integrated circuit (ASIC)) capable of fulfilling one or more functions.

According to the present disclosure, it is possible to train the imaging processing model to reduce such a negative effect that a false pattern due to a noise pattern is output when processing for reducing the noise is performed.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-066048, filed Apr. 1, 2020, which is hereby incorporated by reference herein in its entirety.

What is claimed is:

1. An apparatus configured to train an image processing model for removing noise from an image containing the noise, the apparatus comprising:
   at least one processor;
   a memory coupled to the at least one processor storing instructions that, when executed by the at least one processor, cause the at least one processor to function as:
   an acquisition unit configured to acquire a low-noise image and a plurality of high-noise images having more noise than the low-noise image, the low-noise image being training data for training the image processing model comprising one neural network, the plurality of high-noise images corresponding to a scene in the low-noise image and each having different noise patterns;
   an error calculation unit configured to calculate each of errors between a plurality of output images and the low-noise image, each of the plurality of output images being acquired by inputting a different one of the plurality of high-noise images to the one neural network;
   a stability calculation unit configured to calculate a stability against the noise based on an error between the plurality of output images; and
   a training unit configured to train the one neutral network using a loss function based on the calculated errors and the calculated stability.

2. The apparatus according to claim 1, wherein the stability calculation unit calculates the stability further based on an a noise intensity.

3. The apparatus according to claim 1, wherein the stability calculation unit calculates the stability further based on the calculated errors.

4. The apparatus according to claim 1, wherein the stability calculation unit calculates the stability based on a difference in characteristic amount between the plurality of output images.

5. The apparatus according to claim 1, wherein the at least one processor further functions as:
an extraction unit configured to extract a feature from the low-noise image and calculate a feature strength,
wherein the stability calculation unit calculates the stability further based on the calculated feature strength.

6. The apparatus according to claim 1,
wherein the one neutral network is a multi-layered neural network, and
wherein the stability calculation unit calculates the stability based on an output result acquired from at least one intermediate layer in the multi-layered neural network.

7. The apparatus according to claim 1, wherein the at least one processor further functions as an image processing unit configured to output an image from which the noise has been removed, based on the trained image processing model.

8. A method for training an image processing model for removing noise from an image containing the noise, the method comprising:
acquiring a low-noise image and a plurality of high-noise images having more noise than the low-noise image, the low-noise image being training data for training the image processing model comprising one neural network, the plurality of high-noise images corresponding to a scene in the low-noise image and each having different noise patterns;
calculating, as error calculation, each of errors between a plurality of output images and the low-noise image, each of the plurality of output images being acquired by inputting a different one of the plurality of high-noise images to the one neutral network;
calculating, as stability calculation, a stability against the noise based on an error between the plurality of output images; and
training the one neutral network using a loss function based on the calculated errors and the calculated stability.

9. The method according to claim 8, wherein the calculating, as the stability calculation, calculates the stability further based on a noise intensity.

10. The method according to claim 8, wherein the calculating, as the stability calculation, calculates the stability further based on the calculated errors.

11. The method according to claim 8, wherein the calculating, as the stability calculation, calculates the stability based on a difference in characteristic amount between the plurality of output images.

12. The method according to claim 8, further comprising
extracting a feature from the low-noise image and calculate a feature strength,
wherein the calculating, as the stability calculation, calculates the stability further based on the calculated feature strength.

13. The method according to claim 8,
wherein the one neutral network is a multi-layered neural network, and
wherein the calculating, as the stability calculation, calculates the stability based on an output result acquired from at least one intermediate layer in the multi-layered neural network.

14. A non-transitory computer-readable storage medium storing instructions that, when executed by a computer, cause the computer to perform a method comprising:
acquiring a low-noise image and a plurality of high-noise images having more noise than the low-noise image, the low-noise image being training data for training the image processing model comprising one neural network, the plurality of high-noise images corresponding to a scene in the low-noise image and each having different noise patterns;
calculating, as error calculation, each of errors between a plurality of output images and the low-noise image, each of the plurality of output images being acquired by inputting a different one of the plurality of high-noise images to the one neutral network;
calculating, as stability calculation, a stability against the noise based on an error between the plurality of output images; and
training the image one neutral network using a loss function based on the calculated errors and the calculated stability.

15. The non-transitory computer-readable storage medium according to claim 14, wherein the calculating, as the stability calculation, calculates the stability further based on a noise intensity.

16. The non-transitory computer-readable storage medium according to claim 14, wherein the calculating, as the stability calculation, calculates the stability further based on the calculated errors.

17. The non-transitory computer-readable storage medium according to claim 14, wherein the calculating, as the stability calculation, calculates the stability based on a difference in characteristic amount between the plurality of output images.

18. The non-transitory computer-readable storage medium according to claim 14, further comprising
extracting a feature from the low-noise image and calculate a feature strength,
wherein the calculating, as the stability calculation, calculates the stability further based on the calculated feature strength.

19. The non-transitory computer-readable storage medium according to claim 14,
wherein the one neutral network is a multi-layered neural network, and
wherein the calculating, as the stability calculation, calculates the stability based on an output result acquired from at least one intermediate layer in the multi-layered neural network.

* * * * *